United States Patent
Anderson

(10) Patent No.: US 7,392,284 B2
(45) Date of Patent: *Jun. 24, 2008

(54) META-APPLICATION ARCHITECTURE FOR INTEGRATING PHOTO-SERVICE WEBSITES FOR BROWSER-ENABLED DEVICES

(75) Inventor: Eric C. Anderson, Gardnerville, NV (US)

(73) Assignee: FotoMedia Technologies, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/691,353

(22) Filed: Mar. 26, 2007

(65) Prior Publication Data

US 2007/0192432 A1    Aug. 16, 2007

Related U.S. Application Data

(63) Continuation of application No. 09/752,082, filed on Dec. 29, 2000, now Pat. No. 7,197,531.

(51) Int. Cl.
  *G06F 15/16* (2006.01)
(52) U.S. Cl. ............... 709/203; 709/217; 348/207.1
(58) Field of Classification Search ......... 709/200–203, 709/217–227, 229, 245; 715/501.1, 513, 715/719; 705/14; 348/207.1, 211.1, 211.3
See application file for complete search history.

(56) References Cited

U.S. PATENT DOCUMENTS 4,513,373 A    4/1985   Sheets
5,226,120 A    7/1993   Brown et al.
5,249,230 A    9/1993   Mihm
5,396,546 A    3/1995   Remillard et al.
5,430,827 A    7/1995   Rissanen
5,477,264 A   12/1995   Sarbadhikari et al.

(Continued)

FOREIGN PATENT DOCUMENTS

EP         0856972        8/1998

(Continued)

OTHER PUBLICATIONS

Pan, L., "A Digital Camera With A Function Of Picture Transmission," Database EPODOC, European Patent Office, XP001091526 [TW 403853B (Inventec Corp) Sep. 1, 2000].

(Continued)

*Primary Examiner*—Moustafa Meky

(57) ABSTRACT

A method and system for integrating web photo-services for a browser-enabled device is disclosed. The method and system include providing a server that communicates with the device over a network, and associating images stored on at least one photo-service site with a user account. Thereafter, an inventory of images stored on the device is received from the device, and an image-related web application is provided to the device over the network, where the web application requires access to the user's images. The method and system further include providing a list of the images associated with a user's account to the web application, wherein the list of images includes an image reference for each image and an indication of whether each image is stored on the device or on the photo-service site, such that the web application may perform at least one function on the user's images regardless of where the images are stored.

20 Claims, 5 Drawing Sheets

U.S. PATENT DOCUMENTS

| | | | |
|---|---|---|---|
| 5,490,252 A | 2/1996 | Macera et al. | |
| 5,513,373 A | 4/1996 | Damkier | |
| 5,552,776 A | 9/1996 | Wade et al. | |
| 5,606,365 A | 2/1997 | Maurinus et al. | |
| 5,684,918 A | 11/1997 | Abecassis | |
| 5,737,491 A | 4/1998 | Allen et al. | |
| 5,806,005 A | 9/1998 | Hull et al. | |
| 5,838,926 A | 11/1998 | Yamagishi | |
| 5,845,265 A | 12/1998 | Woolston | |
| 5,905,736 A | 5/1999 | Ronen et al. | |
| 5,926,624 A | 7/1999 | Katz et al. | |
| 5,973,731 A | 10/1999 | Schwab | |
| 5,991,806 A | 11/1999 | McHann | |
| 5,999,968 A | 12/1999 | Tsuda | |
| 6,006,039 A | 12/1999 | Steinberg et al. | |
| 6,009,410 A | 12/1999 | LeMole et al. | |
| 6,012,088 A | 1/2000 | Li et al. | |
| 6,017,157 A | 1/2000 | Garfinkle et al. | |
| 6,035,323 A | 3/2000 | Narayen et al. | |
| 6,064,671 A | 5/2000 | Killian | |
| 6,067,571 A | 5/2000 | Igarashi et al. | |
| 6,069,648 A | 5/2000 | Suso et al. | |
| 6,073,241 A | 6/2000 | Rosenberg et al. | |
| 6,085,195 A | 7/2000 | Hoyt et al. | |
| 6,119,135 A | 9/2000 | Helfman | |
| 6,147,742 A | 11/2000 | Bell et al. | |
| 6,166,729 A | 12/2000 | Acosta et al. | |
| 6,167,469 A | 12/2000 | Safai et al. | |
| 6,185,551 B1 | 2/2001 | Birrell et al. | |
| 6,185,611 B1 | 2/2001 | Waldo et al. | |
| 6,223,190 B1 | 4/2001 | Aihara et al. | |
| 6,226,752 B1 | 5/2001 | Gupta et al. | |
| 6,269,481 B1 | 7/2001 | Perlman et al. | |
| 6,301,586 B1 | 10/2001 | Yang et al. | |
| 6,337,712 B1 | 1/2002 | Shiota | |
| 6,453,361 B1 | 9/2002 | Morris | |
| 6,502,195 B1 | 12/2002 | Colvin | |
| 6,529,522 B1 | 3/2003 | Ito et al. | |
| 6,567,122 B1 | 5/2003 | Anderson | |
| 6,573,927 B2 | 6/2003 | Parulski et al. | |
| 6,578,072 B2 | 6/2003 | Watanabe | |
| 6,581,094 B1 | 6/2003 | Gao | |
| 6,608,973 B2 | 8/2003 | Masera | |
| 6,623,528 B1 | 9/2003 | Squilla | |
| 6,628,325 B1 | 9/2003 | Steinberg et al. | |
| 6,636,259 B1 | 10/2003 | Anderson et al. | |
| 6,647,409 B1 | 11/2003 | Sherman et al. | |
| 6,650,831 B1 | 11/2003 | Thompson | |
| 6,657,702 B1 | 12/2003 | Chui et al. | |
| 6,715,003 B1 | 3/2004 | Safai et al. | |
| 6,784,924 B2 | 8/2004 | Ward et al. | |
| 6,930,709 B1 | 8/2005 | Creamer et al. | |
| 7,197,531 B2 * | 3/2007 | Anderson | 709/203 |
| 2002/0054224 A1 | 5/2002 | Wasula et al. | |
| 2004/0046868 A1 | 3/2004 | Anderson et al. | |
| 2004/0174440 A1 | 9/2004 | Kojima et al. | |

FOREIGN PATENT DOCUMENTS

| | | |
|---|---|---|
| EP | 0878956 | 11/1998 |
| EP | 0930770 | 7/1999 |
| JP | 01-352394 | 12/2001 |
| WO | WO 99/21336 | 4/1999 |
| WO | WO99/39275 | 8/1999 |
| WO | WO 99/48276 | 9/1999 |
| WO | WO0062539 | 10/2000 |

OTHER PUBLICATIONS

JP 09233453 Canon Inc.) Sep. 5, 1997 (abstract) [online] Retrieved from the PAJ database.

JP 10105517 (Takasaki) Apr. 24, 1998 (abstract) [online] Retrieved from the PAJ database.

JP 2000047988 (Tozono) Jul. 28, 1998 (abstract) [online] Retrieved from the PAJ database.

Ando, K., "How To Establish An EC Site (e-commerce site) For Mobile Telephone," Nikkei Internet Technology, Japan, Nikkei BP, Jun. 22, 2000, vol. 36, pp. 113-131.

Kuragaki, K., "Meta-Application Development Support on WWW," Proceedings of the 60th Annual Convention IPS Japan (3), Information Processings Society of Japan, Mar. 14, 2000, pp. 3-83 to 3-84.

* cited by examiner

META-APPLICATION ARCHITECTURE FOR INTEGRATING PHOTO-SERVICE WEBSITES FOR BROWSER-ENABLED DEVICES

CROSS-REFERENCE TO RELATED APPLICATIONS

The present application is a Continuation of U.S. patent application Ser. No. 09/752,082, filed on Dec. 29, 2000, now U.S. Pat. No. 7,197,531 entitled "Meta-Application Architecture For Integrating Photo-Service Websites For Browser-Enabled Devices," commonly owned with this application and herein incorporated by reference. The present invention is also related to U.S. patent application Ser. No. 09/698,777, entitled "Meta-Application Architecture For Integrating Photo-Service Websites," filed on Oct. 27, 2000, now U.S. Pat. No. 6,453,361, commonly owned with this application and herein incorporated by reference.

FIELD OF INVENTION

The present invention relates to manipulating digital images over the Internet, and more particularly to providing an architecture for integrating photo-service-based websites for access by client devices.

BACKGROUND

As the popularity of digital cameras grows, the desire of digital camera users to share their images with others will also continue to grow. The best approaches to photo-sharing take advantage of the Internet. Several Internet companies now offer an even more convenient approach by providing photo-sharing websites that allow users to store their images for free and to arrange the images into web-based photo albums. Once posted on a photo-sharing website, others may view the images over the Internet.

The assignee of the present invention has developed a system for uploading images to the Internet, directly from the camera, as described in U.S. Pat. No. 6,636,259 entitled "Automatically Configuring A Web-Enabled Digital Camera To Access The Internet" issued Oct. 21, 2003.

In this system, cameras connect to a gateway server on the Internet via a service provider, which may include a wireless carrier and/or an Internet service provider (ISP). In order to create a camera that requires no configuration to connect to the Internet, the camera is provided with a software application that is pre-configured to establish communication with the ISP and the gateway server. Upon establishing a connection, the camera sends the user's account ID and password to the gateway server. The user account information is then stored on the camera for use the next time the electronic device accesses the website. Thus, the user does not have to enter account information in order to establish the ISP connection or the website account before accessing the Internet.

The gateway performs two basic services for the client. First, it is the camera's home base, which provides authentication services (user and device) and configuration services (it updates the camera's configuration, so the user doesn't have to). Second, it receives and responds to the camera application's requests using a protocol both understand. Services available to a camera may include the ability to send images from the camera to a specific photo-service service and the ability to send emails with links to uploaded images.

The current gateway solution is built on traditional client-server architecture, where a software application on the camera communicates with a software application on the server. Client-server architecture requires custom software on all three tiers of the current architecture; the camera, the gateway, and the photo-service site. In addition, the current gateway solution only enables communication with digital cameras, not other mobile devices.

A newer model for application deployment on the Internet today is server-based (i.e., ASP model), where a client device equipped with a web browser communicates with a web server. Browser-based devices simply download web pages from the server, which provides the application function and data. The deployment of web applications using this new server-based architecture is growing much faster than the deployment of client-server based applications because browser-based clients do not require a gateway that "speaks" the client application's protocol. Thus, browser-based clients may connect to the photo-service sites directly, since the devices are browser-based. In addition, browser-based clients also do not require embedded custom software for requesting imaging services from the photo-service sites. Instead, once connected, users of these devices could interact with the photo-services sites directly using the device's browser to display web applications from the photo-service sites if the sites support the specific browsers in these devices, or indirectly via a transcoding gateway.

A transcoding gateway converts the sites' HTML to a format suitable for the various browser types. Transcoding products exist today that can support multiple browser-based clients that are both wireless and wired. Transcoding technology takes a formatted input stream (typically HTML) from a web server and converts it to an output stream in another format (e.g., WML for WAP phones, cHTML for i-mode phones, etc) of a particular type of browser-based device. Digital cameras will soon be equipped with browsers, just as PDA's and cellphones are, and such transcoding products allow, or soon will allow, browser-based devices to access the images and image services of photo-services sites.

There are two main problems with equipping digital cameras with web browsers for communication with photo-service sites and for running their web applications. One problem is making the presentation of the web applications palatable to the various types of browser-based devices, given the variety of display characteristics and browser technologies. There are two approaches to addressing this presentation problem.

One approach is for each photo-service site to build custom web pages for each specific device/browser type. That is, the photo-service site would need to provide web pages formatted in HTML, WML, cHTML, and so on, and preprocess images to suit the device display capabilities. This is both labor intensive to initially setup and difficult to maintain as changes are made to the site's data and services.

A second approach is to use a transcoding product, such as a WAP gateway or Oracle's Portal-to-Go. The problem with the transcoder approach is that it tries to solve a very broad problem, making all HTML encoded information presentable in a number of other different formats. Consequently, transcoders often produce unsatisfactory results. Transcoders thus serve as a temporary solution while photo-service sites build support for each of the various devices directly into their sites.

As digital imaging grows in popularity, there will be a need for disparate photo-service sites to integrate their offerings (e.g., photo-hosting from one, and printing from another). This requires that two photo sites wishing to become partners must each enable their sites to communicate. Neither of the two approaches described above addresses the requirement of integrating the services that span the sites of multiple photo-service providers. Since there is no standard for inter-site communication for photo-service sites, this effort must be undertaken for each new partner a site agrees to work with.

The second problem with equipping digital cameras with web browsers for displaying web applications from photo-service sites is the limitations inherent in web browsers, which is that browsers typically do not allow web applications to have access to content of the requesting device. Using a PC environment as an example, assume a user wants to upload images to a photo-sharing site on the Internet using a browser. To upload images, the user navigates to the photo sharing site and clicks an "upload" button. In response, the photo sharing site sends an upload web page to the user's PC. Because the web browser does not allow the upload web page to access to the hard drive, the upload page displays several blank image name fields for the user to fill-in. If the user does not know the names of the images, the user must click a "browse" button on the web page in order to search the directories on the PC for the desired image files. Once the user navigates to the correct directory and selects one of the images files, the name of the image file is then inserted into one of the image name fields on the web page. The process is then repeated for each image the user wants to have uploaded.

Due to limitations imposed by web browsers on web applications with respect to the ability to access the internal storage of the requesting device, the process of manipulating images over the Internet via web browsers is burdensome and inefficient.

Accordingly, what is needed is a method and system for integrating web photo-services for browser-enabled client devices. The present invention addresses such a need.

SUMMARY OF THE INVENTION

The present invention provides a method and system for integrating web photo-services for a browser-enabled device. The method and system include providing a server that communicates with the device over a network, and associating images stored on at least one photo-service site with a user account. Thereafter, an inventory of images stored on the device is received from the device, and an image-related web application is provided to the device over the network, where the web application requires access to the user's images. The method and system further include providing a list of the images associated with a user's account to the web application, wherein the list of images includes an image reference for each image and an indication of whether each image is stored on the device or on the photo-service site, such that the web application may perform at least one function on the user's images regardless of where the images are stored.

According to the present invention, the function of the web application is extended by allowing the web application to have access to references to the user's images, but not to the images themselves. Thus, the present invention overcomes the limitations imposed on the web application by the web browser and allows the web application to make intelligent decisions about what functions to perform on the user's images regardless of the images' storage locations.

DETAILED DESCRIPTION OF THE INVENTION

The present invention relates to an online digital imaging architecture. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

The present invention provides a meta-application architecture for allowing photo-service websites to receive and send images to and from a wide range of client device types, and for integrating the services of the photo-service sites 14 for access by users of the client devices. The present invention also allows web applications running in a web browser on the client devices to access all of the user's image files regardless of whether the image files are stored on the client device or on sites on the Internet, thereby enhancing imaging services provided to the client devices.

Figure 1:
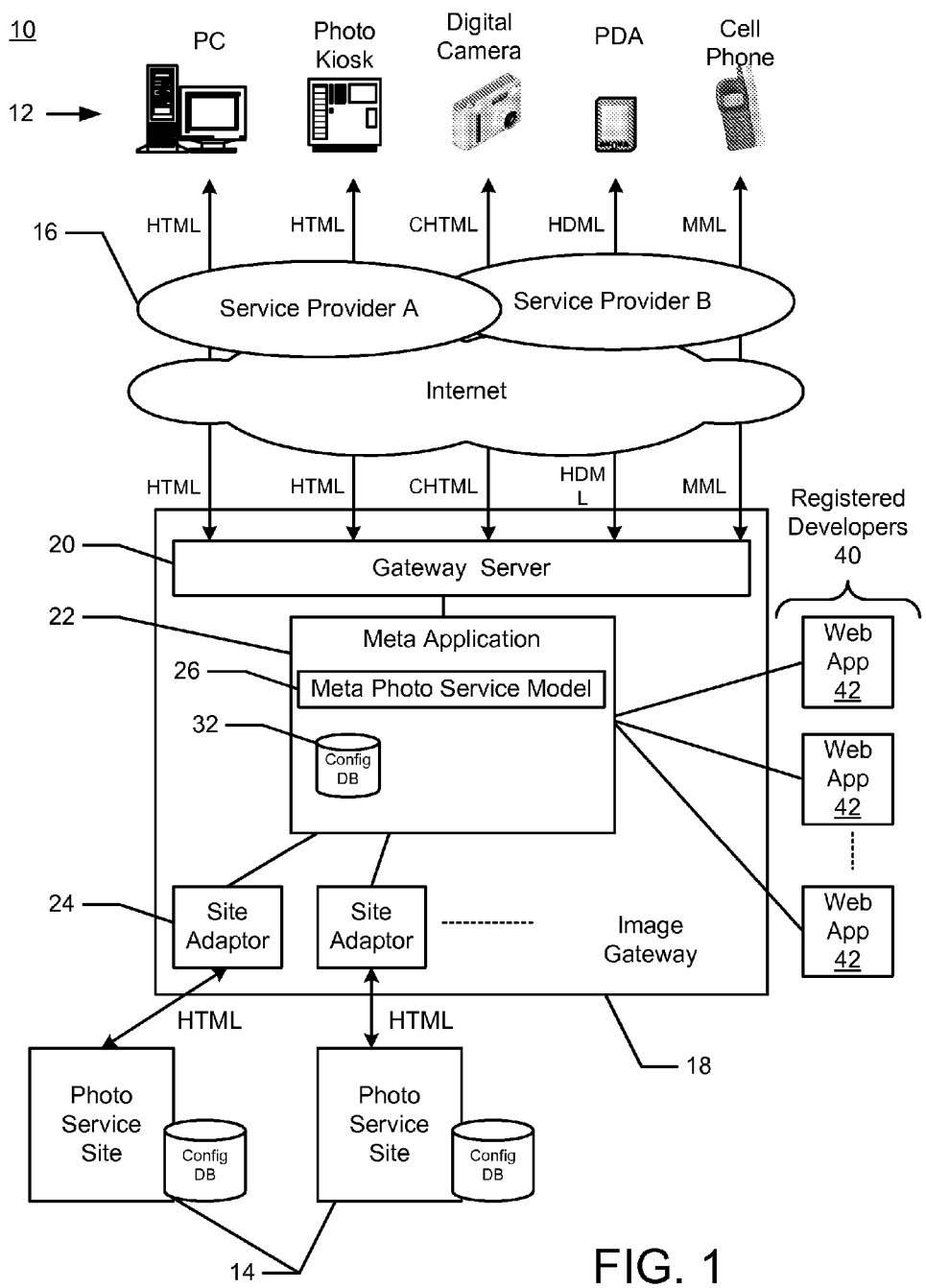
FIG. 1 is a block diagram illustrating a meta-application architecture for an online system in accordance with a preferred embodiment of the present invention.

FIG. 1 is a block diagram illustrating a meta-application architecture for an online system 10 in accordance with a preferred embodiment of the present invention. The system 10 includes multiple client devices 12 that request imaging services from multiple online photo-service sites 14. The photo-service sites 14 are sites on the Internet that provide different types of digital imaging services. For example, one photo-service site 14 may provide an image hosting service, while another photo-service site 14 provides image printing services, for instance.

A client device 12 refers to an electronic device capable of capturing and/or displaying digital images and communicating over a network, such as the Internet. Such electronic devices include devices that store digital images, such as PCs and photo kiosks, and image capture devices such as digital cameras and PDAs, and cellphones that have lens attachments, for example. In a preferred embodiment, the client devices 12 are browser-based, although non-browser-based devices may also be supported. The client devices 12 communicate over the Internet via a wireless, or wired connection, but because they incorporate different browser types, the client devices 12 communicate data in different formats. For example, some client devices 12 such as PCs may communicate data in HTML format. Other client devices 12 such as cellphones, may use data formats such as Wireless Markup Language (WML), which is a streamlined version of HTML for small screen displays, cHTML which is a subset of HTML, and Handheld Device Markup Language (HDML), for instance.

In one embodiment, the client devices 12 connect to the Internet via a service provider 16, which may include a wireless carrier and/or an Internet service provider (ISP). Once connected to the Internet, the client devices 12 have the capability of uploading the digital images to the online photo-service sites 14 for storage and/or for receiving digital images from the photo-service sites 14 for display.

One aspect of the present invention provides a meta-application 22 architecture that provides a common communication framework for integrating photo-service sites 14 and services for client devices 12. The meta-application architecture includes a site on the Internet, referred to as the image gateway 18, that interfaces between the client devices 12 and the photo-service sites 14. In a preferred embodiment, the image gateway 18 includes a gateway server 20, a software meta-application 22, and a set of site adapter software 24 that provide a set of standard APIs and data formats that the photo-service sites 14 use so that the image gateway 18 can present data and services from the sites 14 to the various client devices 12. These same APIs and data formats allow the image gateway 18 to present the services of multiple photo-services 14 in one integrated application, and allow communication among the photo-services sites 14. For example, the image gateway 18 enables a user with images stored on one photo-host site to access to the services of all print service providers who also use the image gateway 18. The photo-hosting site 14 would not need to make any special effort in order to work with the print service providers since they are all bound together by the meta-application.

The gateway server 20 performs the function of a web server, while the meta-application 22 performs the function of an application server. The meta-application 22 may reside on the same or different computer from the gateway server 20, and one of the photo-service sites may be part of the image gateway 18. The gateway server 20 provides client device 12 connectivity and is primarily responsible for detecting the client device 12 type and its browser type and display characteristics. The gateway server 20 may also provide security, configuration, and administration services, including the collection of usage statistics.

In a preferred embodiment, the gateway server 20 passes the data and service requests of the client devices 12 and from the meta-application 22 in a device independent fashion.

One reason that there is no standard for communication between photo-service sites 14 is because each photo-service site 14 represents its own data and services in different formats. For example, all photo-hosting web sites 14 organize a user's images in a nested tree-like structure similar to a file directory, but the names of the nodes in these trees vary across sites. For instance, some of the terms used include "album," "pholio," "page," and "shelves".

According to the present invention, the meta-application 22 abstracts the underlying data model and the function provided by the photo-service sites 14, which is common across the photo-service sites 14, to define a common data model format for the data, referred to here as a meta photo-service model. In a preferred embodiment, the meta photo-service model is implemented using XML.

Since each photo-service site 14 may use its own data model and define its own API or protocol for accessing the site's functionality, respective site adapters 24 are used to convert between the data and service formats of each photo-service site 14 and the meta photo-service model 26.

In a preferred embodiment, the image gateway 18 is provided with a database 32 for supporting the aggregation of data and services across the various photo-service sites 14. This enables the image gateway 18 to support a single login for a particular client device 12 and enables data sharing, such as billing information, across photo-service sites 14. This data sharing eliminates the need for users to reenter this information for each site, but requires that the database 32 be synchronized with the data stored on the photo serving sites.

According to a further aspect of the present invention, developers who have registered with the image gateway 18 may post web applications 42 on the image gateway 18 for access by the client devices 12. In a preferred embodiment, the web applications 42 are imaging related and allow the users of the client devices 12 to manipulate their images in some manner. Examples of such imaging-related web applications 42 that may be provided include an upload image application that uploads images from the client device 12 to a photo-hosting service 14 via the image gateway 18, and a search application that searches for the user's images, for instance.

It should be noted that although the terms images as used herein includes media types such as still images, burst images, and time lapse images, the term images also encompasses media types such as movies, sound annotations, animations, and clip art, for instance.

In a preferred environment, the web applications 42 are implemented as server-side processes that allow web pages to interact with databases and other applications. Examples of such server-side processes include active server pages (ASPs), CGI scripts and JavaServer Pages (JSPs), which are web pages that contains HTML and embedded programming code that is executed by a server. When a web browser makes a request from the web application 42 for a web page, the server executes the embedded program, and the HTML provides the page layout that will be returned to the web browser. The programming code provides the processing for the page, such as delivering search data entered on a web page to the database for lookup. It would also format the results of that search as HTML and send it back to the client device 12 for display.

When a user attempts to work with his or her images on the browser-enabled client device 12 using one of the web applications 42, the user's images may be stored in one of three ways; 1) on the client device 12, 2) on one or more photo-service sites 14, or 3) on both the client device 12 and one or more photo-service sites 14.

Displaying the user's images on the client device 12 using a conventional browser may be accomplished in one of two ways. First, the images stored locally on the client device 12 could be displayed by storing an HTML page that references those images in the device 12 and then opening the HTML page in the web browser. Second, the images that are stored on a web server could be displayed by the web server by sending an HTML page referencing those images to the web browser on the device 12. Where the conventional browser fails is where the HTML page is being sent from the server to the device 12, but the image files that need to be referenced are stored on the client device 12. Thus, if the web application 42 needs to access images stored both in the device 12 and on the server, a problem arises because the browser on the client device 12 will typically not allow the web application 42 access to the contents of the client device 12. In addition, the web application 42 would have no way of knowing about the user's images that are stored on other photo-service sites 14.

Besides providing a method for integrating web photo-services for a browser-enabled device, the present invention also allows a web application 42 sent from one server to know about files stored in locations other than that server. More specifically, the meta-application architecture of the present invention provides web applications 42 (under strict control and security) access to the user's images, which may be stored both locally on the client device 12 and distributed across photo-service sites 14.

Figure 2A:
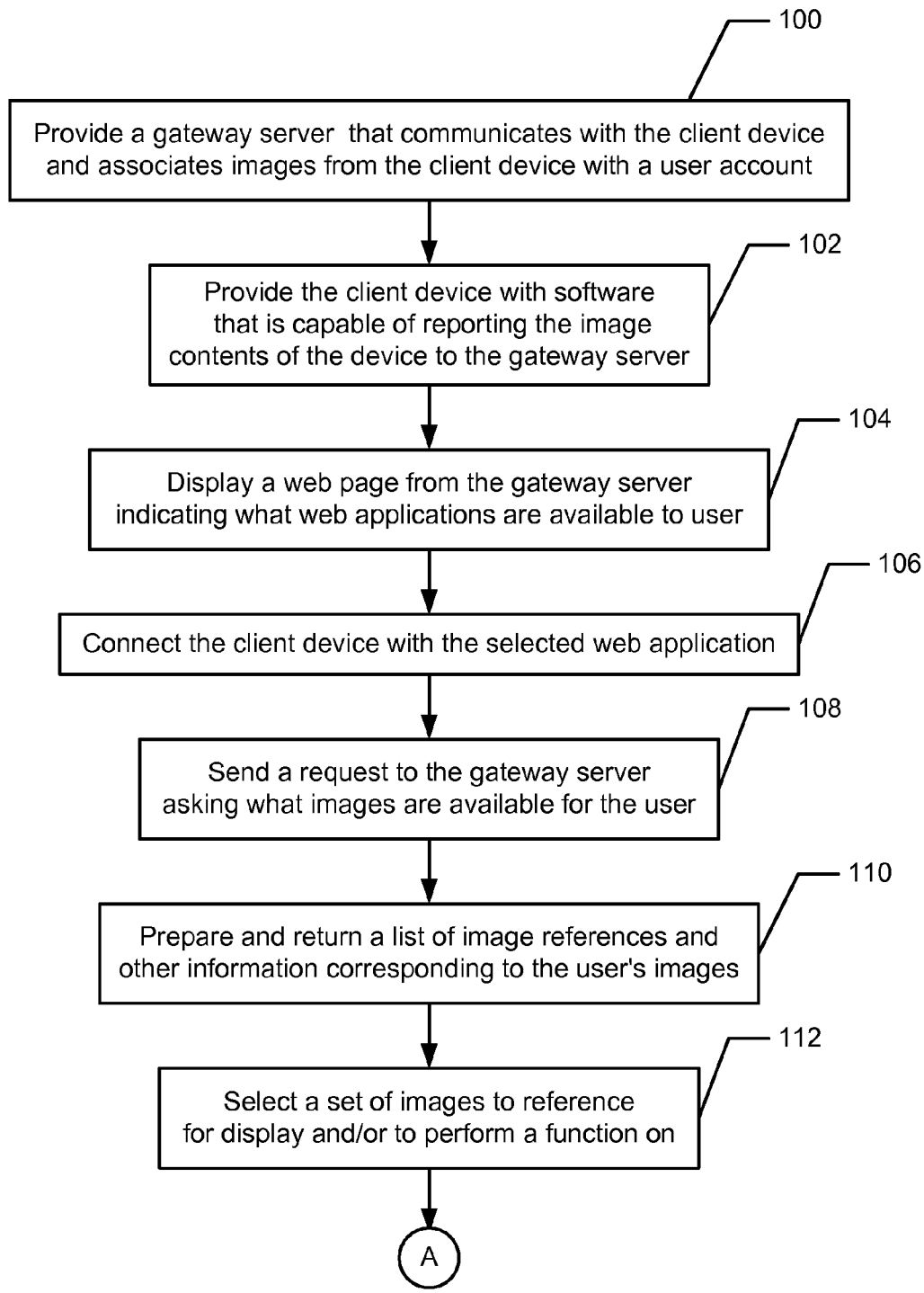
FIGS. 2A and 2B are a flow chart illustrating a process for allowing a web application to access image files stored on both a client device and distributed across remote locations in a preferred embodiment of the present invention.
Figure 2B:
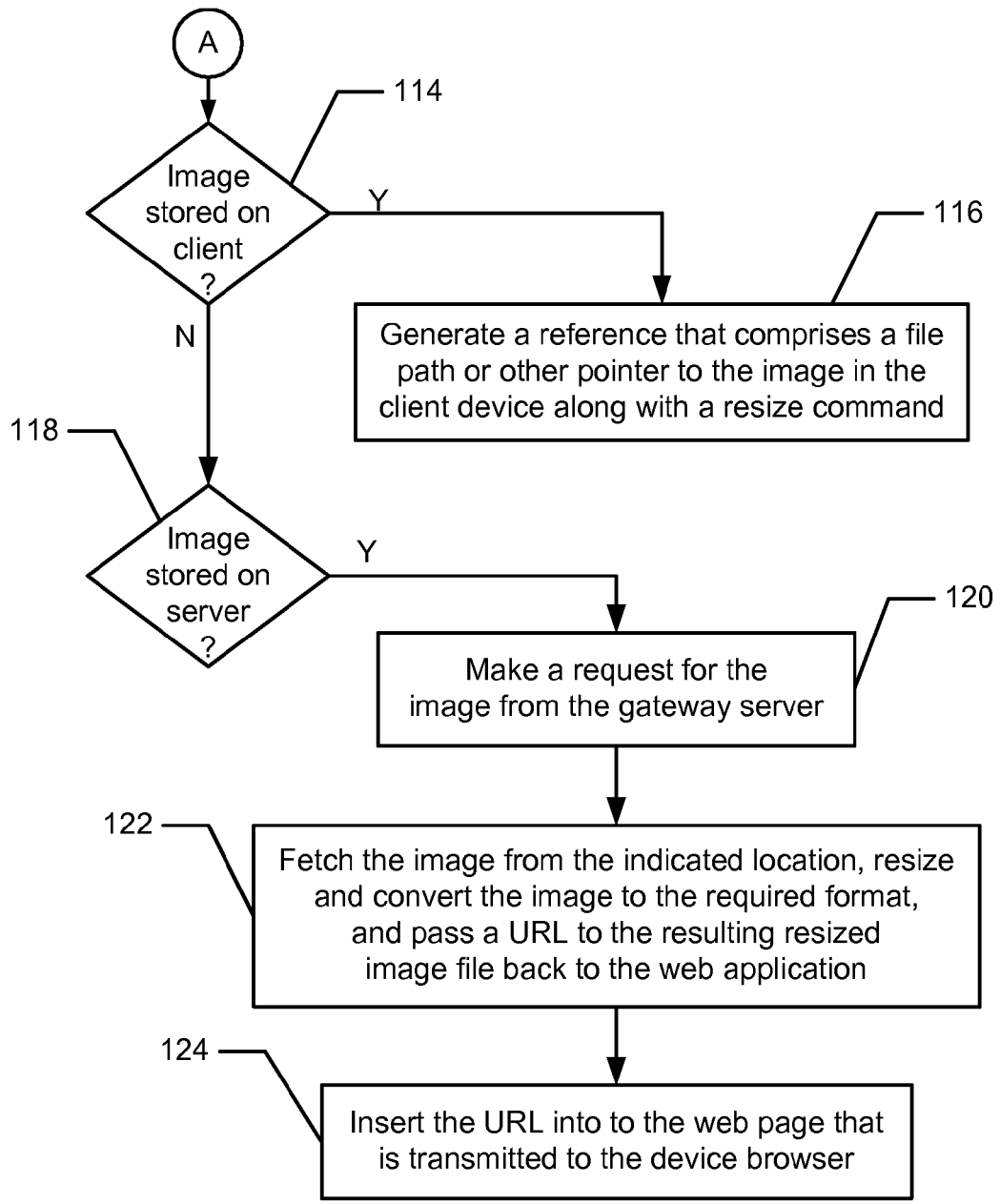

FIGS. 2A and 2B are a flow chart illustrating a process for allowing a web application 42 to access image files stored on both a client device and distributed across remote locations in a preferred embodiment of the present invention. The process begins by providing a gateway server 20 that communicates with the client device 12 and associates images from the client device 12 with a user account in step 100. As described above, the user's previously uploaded images may be distributed across various photo-service sites 14.

The client device 12 is also provided with software that is capable of reporting the image contents of the device to the gateway server 20 in step 102. The software may report the image contents of the device either automatically, or at the request of the user or the image gateway 18. In a preferred enlightenment of the present invention, the software that reports the image contents to the gateway server 20 is a customized web browser. In an alternative embodiment, the underlying software in the client device 12 that establishes the connection to the gateway server 20 is responsible for reporting the images in the client device 12 to the gateway server 20. In the second embodiment, the browser itself need not know about the images directly, but only through references provided via downloaded pages from the gateway server 20.

Once communication between the client device 12 and the image gateway 18 has been established, the client device displays a web page from the gateway server 20 indicating what web applications 42 are available to user in step 104. In a preferred environment, the available web applications 42 are displayed via hyperlinks. For example, the web page displayed to the user may display links such as "Upload Images," and "Search For Images," which link to corresponding web applications 42.

In response to the user selecting a web application, the gateway server 20 connects the client device with the selected web application 42 in step 106. Those with ordinary skill in the art will appreciate that the connection is preferably established with a secure handshake mechanism.

When the web browser in the client device 12 begins interacting with the web application 42, the web application 42 sends a request to the gateway server 20 asking what images are available for the user in step 108. In a preferred embodiment, the web application 42 identifies the user to the gateway server 20 using the user account or user ID, which was provided to the web application 42 when the connection was made to the application 42 by the gateway server 20. In response, the gateway server 20 prepares and returns a list of image references and other information corresponding to the user's images in step 110.

Figure 3:
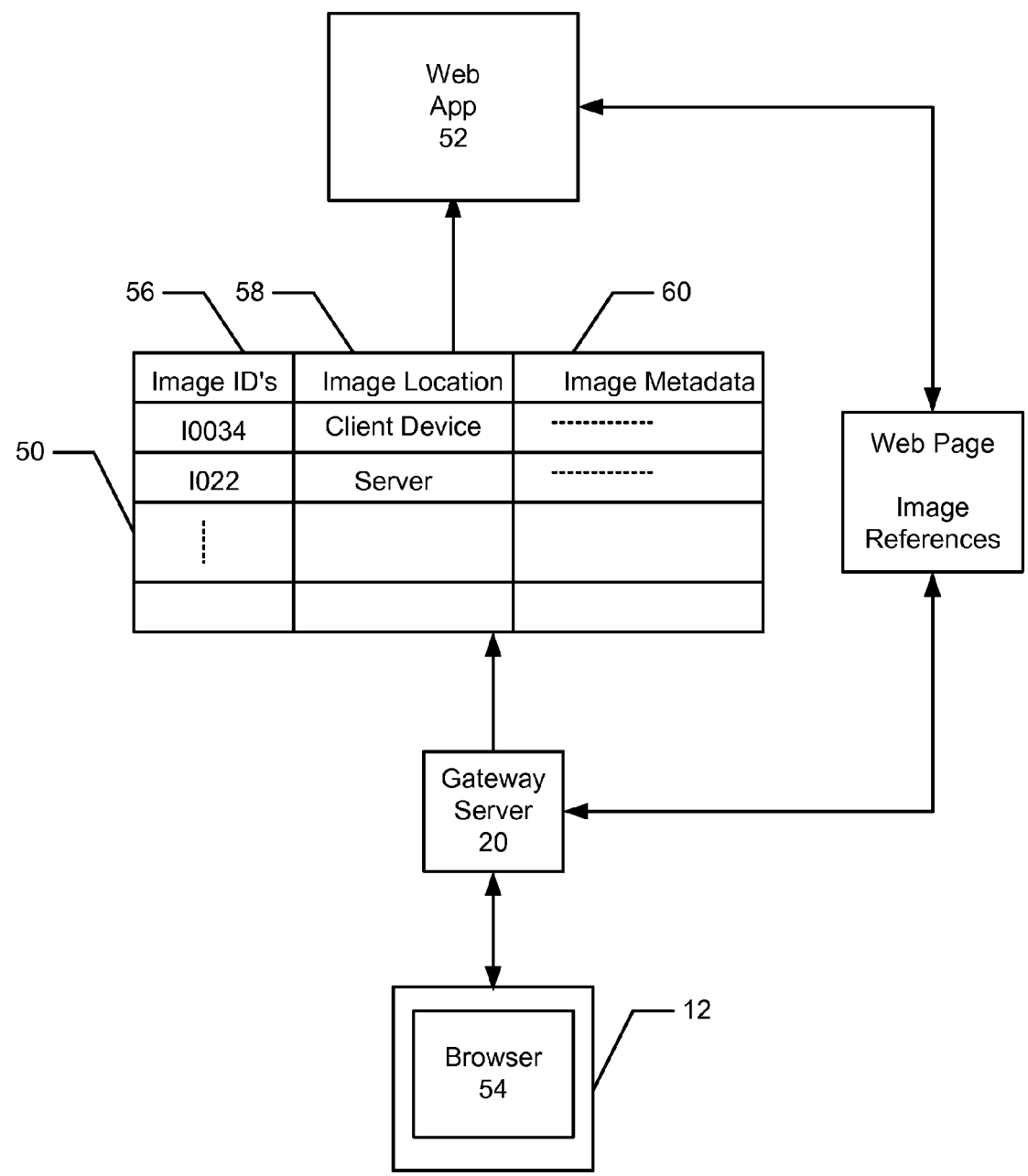
FIG. 3 is a diagram illustrating an example image list sent from the gateway server to the web application contracting with the browser of the client device.

FIG. 3 is a diagram illustrating an example image list 50 sent from the gateway server 20 to the selected web application 42 interacting with the browser 54 on the client device 12 through the gateway server 20. In a preferred embodiment, the image references in the list 50 comprise image identifiers (IDs) 56 name, or an internal disk reference (e.g., file path). The information included in the list may include the location 58 of each image (e.g., the device or a server), and may even include information about which server. The information may also include metadata 60 corresponding to each image. The metadata 60 is data in a file or database. Examples of metadata 60 include values for parameters such as f-stop, zoom factor, focus distance, category tags, image name, camera manufacturer and model number, and so on. Specific metadata may be requested by the web application to be included in the list, including custom user metadata.

According to the present invention, the web application 42 interacting with the browser on the client device 12 is not given access directly to the user's images, instead the web application 42 is only given access to information about the images via the image list 50. The information in the list 50 returned to the web application 42 is sufficient to allow the web application 42 to sort and select the images to carry out its function.

Referring again to FIGS. 2A and 2B, after receiving the image list 50, the web application 42 selects a set of images to reference for display and/or to perform a function on in step 112. As shown in FIG. 3, the web application 42 places these references in web pages that are returned to the device browser 54 through the gateway server 20.

Referring again to FIG. 2B, for images that are identified in the list 50 as being stored locally on the client device 12 in step 114, the web application 42 generates a reference that comprises a file path or other pointer to the image in the client device 12 along with a resize command in step 116. Preferably, this translation from image ID to the file path is performed by the gateway server 20 when the web page containing the ID passes through on its way from the web application 42 to the client device 12.

For images that are identified in the list 50 as being stored on a photo-service site 14 or other server in step 118, the web application 42 makes a request for the image from the gateway server 20 using the image ID in step 120. The gateway server 20 then fetches the image from the indicated location, resizes and converts the image to the required format, and passes a URL to the resulting resized image file back to the web application 42 in step 122. The web application 42 then inserts this URL into to the web page that is transmitted to the device browser 54 in step 124. Alternatively, the translation from image ID to a URL to a resized, converted image file is performed at the gateway server 20 when the web page containing the ID passes through on its way from the web application 42 to the client 12. For image viewing, there is no actual requirement for the web application 42 to have a copy of the image or images being displayed on the client device 12.

The entire viewing function can be done with image references, along with appropriate gateway functions and browser requests for local files. However, when a web application 42 wishes to perform an operation on an image, such as color balance, contrast enhancement, rotate, etc., an actual copy of the image is required at the web application 42. Thus, the web application can request a copy of the image from the gateway server 20 in any resolution up to full image resolution. In this case, the web application 42 will perform whatever function desired, and create any versions of the image, such as thumbnails, within its own file system for reference by the browser 54. The modified images can be temporary or permanent. For permanent images, the web application 42 must request that the gateway server 20 store the resulting image in an appropriate location, depending on the user's account information.

The web application 42 may also need to delete images selected by the user. For example, if a modification is performed, and the user wants to keep the modification and not the original, a delete function is required. If images are uploaded from the client device 12 to a photo hosting/sharing service, the user may wish the copies in the device 12 be deleted, thus eliminating duplicate storage. However, allowing the web application 42 to delete images is a dangerous practice. It is assumed that all destructive operations are carried out over secure connections to prevent unauthorized access, but even with this protection, additional security protection is required.

The preferred embodiment is for the delete function to be handled by the gateway server 20. In this case, any image delete functions must be requested by the web application 42. The gateway server 20 would be responsible for issuing the appropriate warning to the user via the browser 54 or its underlying software. Additionally, the gateway server 20 may cache copies of all deleted files for a period of time or until the user "empties the trash," thus preventing the user from accidentally destroying valuable images. This is especially true for deletes of original images when image modifications are done. It is good practice to never delete the original image, and carry modifications via additional files.

The present invention will now be explained by way of a particular example where the web application 42 provides an image upload function for the user of the browser-enabled client device 12.

Figure 4:
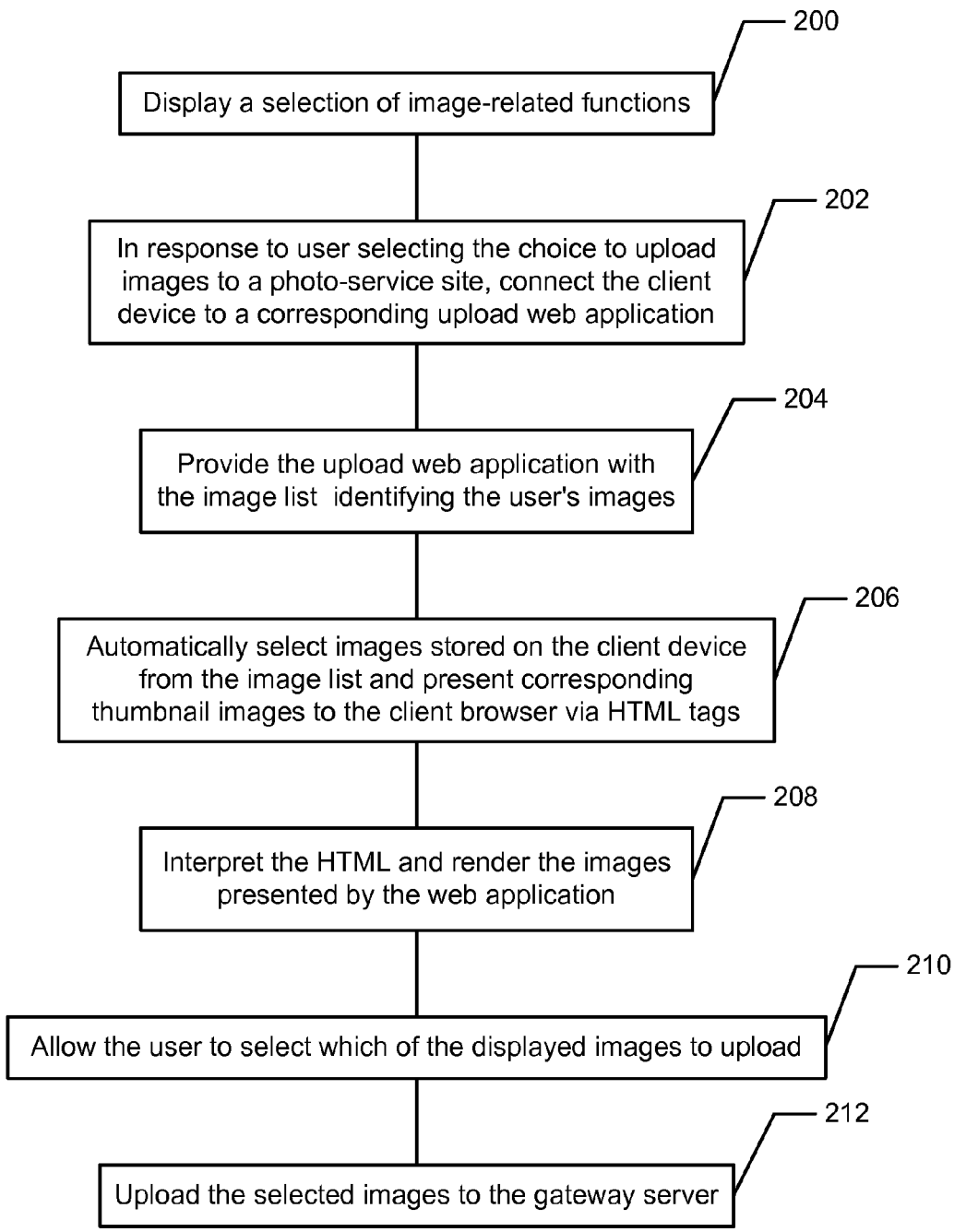
FIG. 4 is a flow chart illustrating the process of uploading images from a web-enabled client device using a web application that is accessed through the image gateway in accordance with a preferred amount of the present invention.

FIG. 4 is a flow chart illustrating the process of uploading images from a web-enabled client device 12 using a web application 42 that is accessed through the image gateway 20 in accordance with a preferred embodiment of the present invention. During normal operation of the client device 12, the user may be shown a homepage of the image gateway 20, which displays a selection of image-related functions the user may want to use in step 200. In response to user selecting the choice to upload images to a photo-service site 14, the gateway server 20 connects the client device 12 to a corresponding upload web application 42 in step 202. The gateway server also provides the upload web application 42 with the image list 50 identifying the user's images in step 204. As described above, the image list 50 will identify both images present in the client device 12 as well as images stored on the client device and the image gateway 18 and other photo service sites 14.

The upload web application 42 will then automatically select images stored on the client device from the image list 50 and present corresponding thumbnail images to the client browser via HTML tags in step 206. In a preferred environment, the HTML tags incorporate the image IDs and/or file paths from the image list 50 and may also include height and width tags for resizing the original image into the thumbnail image.

The browser 54 on the client device 12 then interprets the HTML and renders the images presented by the web application 42 (resizing the original images if necessary) in step 208. Since the images are local, no web traffic is required to service the image tags—they are accessed locally and resized locally. The web applications 52 allows the user to select which of the displayed images to upload in step 210. In response, the web application 42 uploads the selected images to the gateway server 20 in step 212, where they are then transmitted on to the selected photo-service site 14

After successful completion of the upload, the web application 42 may ask the user if the device resident copies of the uploaded images should be deleted. If the user selects YES, a request for deletion is issued by the web application 42 to the gateway sever 20. The gateway server 20 performs the appropriate deletion function, typically including getting confirmation from the user before proceeding. The confirmation may come from the gateway server 20, or may come from underlying software in the client device 20, which is designed to intercept any delete requests from the browser or internet connection.

As a further example, assume that a developer provides a search web application 42, which when run on the browser 54 of the client device 12 allows the user to enter search criteria, and in response, the search web application 42 returns and displays a set of images meeting those criteria. In operation, the gateway server 20 would provide the web application 42 with a list 50 of the user's images. As described above, the image list 50 would include for each image an image ID 56, the location 58 of the image, and any metadata 60 associated with the image. The metadata 60 could be specifically requested, based on the user criteria. The web application 42 would then use this information to find the images matching the user's search criteria. For the found images that are stored in locations other than the client device 12, the web application 42 would request that the gateway server 20 fetch, resize, and convert these images for access by the browser 54 in the client device 12. The web application 42 would thus combine the images found on the client device 12 with the images transmitted from the gateway server 20 and display them to the user through the browser 54.

According to the present invention, the meta-application architecture provides a service that extends the functionality of web applications 52 that function through the browser on the client device. Image-related web applications 52 can now operate on all of a user's images without regard to where the images are stored and can make intelligent services available to the user. The intelligence for handling where the images are located and what to do with the images to make them display in the client device 12 is performed by the image gateway 18 for the web application 42. Since most photo-service sites 14 today do not have the ability to interact directly over the Internet with client devices 12, the present invention provides a service that allows an interface designed for the LCD screen of the client device 12 to access the photo-service sites 14 that don't have that capability, and brings all the user's images under one service and one access point.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for allowing a web application to operate on images stored on a browser-enabled device and on images stored in a remote location, comprising:

provides a server that communicates with a browser-enabled device over a network;

providing an image-related web application to the device over the network, the web application executable on a web browser included in the device;

receiving, by the web application, a list of images stored on the device from the device and a list of images stored at a remote location from the server; and providing, by the web application, content combining the lists of images received from the device and the server, wherein the content is presentable via the web browser and includes an image reference for each image included in the combined lists of images and an indication of whether each image is stored on the device or at the remote location, whereby the web application may perform at least one function on the images regardless of where the images are stored.

2. The method of claim 1, comprising allowing for selection of the web application from the browser-enabled device.

3. The method of claim 2, comprising:

for an image that is indicated as being stored on the browser-enabled device, generating, by the web application, a reference that comprises a file path to the image stored on the browser-enabled device along with a resize command; and for an image that is indicated as being stored at the remote location, requesting, by the web application, a reference to a corresponding resized image from the server.

4. The method of claim 3, comprising:
for an image that is indicated as being stored at the remote location, configuring the server to fetch the image from the indicated remote location;
resizing and converting the fetched image to a required format; and
passing a URL to the resized and converted image back to the web application for insertion into the content that is provided by the web application to the browser-enabled device.

5. The method of claim 4, wherein the web browser is configured to interpret the references included in the content provided by the web application and to render images associated with the interpreted references on the browser-enabled device.

6. The method of claim 5, comprising:
allowing, by the web application, for selection from among the rendered images; and
performing the at least one function on the images corresponding to the selected rendered images.

7. The method of claim 6, wherein the web browser is configured to provide the list of images stored on the browser-enabled device to the web application.

8. The method of claim 1, wherein the at least one function performed by the web application includes at least one of an image viewing, editing, deletion, uploading, and searching function.

9. A system for allowing a web application to operate on images stored on a browser-enabled device and on images stored in a remote location, comprising:
a server that communicates with a browser-enabled device over a network; and
an image-related web application, downloadable to the device over the network, the web application executable on a web browser included in the device and configured for receiving from the device a list of images stored on the device, for receiving from the server a list of images stored at a remote location, and for providing content combining the lists of images received from the device and server, wherein the content is presentable via the web browser and includes an image reference for each image included in the combined lists of images and an indication of whether each image is stored on the device or at the remote location, whereby the web application may perform at least one function on the images regardless of where the images are stored.

10. The system of claim 9 wherein the web application is selectable from the browser-enabled device.

11. The system of claim 10 wherein for an image that is indicated as being stored on the browser-enabled device, the web application is configured to generate a reference that comprises a file path to the image stored on the browser-enabled device along with a resize command, and for an image that is indicated as being stored at the remote location, the web application is configured to request a reference to a corresponding resized image from the server.

12. The system of claim 11 wherein the web application is configured to:
fetch an image that is indicated as being stored at the remote location from the indicated remote location;
resize and convert the fetched image to a required format, and
pass a URL to the resized and converted image back to the web application for insertion into the content that is provided by the web application to the browser-enabled device.

13. The system of claim 12, wherein the web browser is configured to interpret the references from the web application and to render images associated with the interpreted references on the browser-enabled device.

14. The system of claim 13, wherein the web application is configured to allow for selection from among the rendered images and to perform the at least one function on the images corresponding to the selected rendered images.

15. The system of claim 14, wherein the web browser is configured to provide the list of images stored on the browser-enabled device to the web application.

16. The system of claim 9, wherein the at least one function performed by the web application includes at least one of an image viewing, editing, deletion, uploading, and searching function.

17. A system for allowing a web application to operate on images stored on a browser-enabled device and on images stored in a remote location, comprising:
a client device having images stored thereon, the client device configured to communicate with a server over a network; and
a web browser included on the client device, the web browser configured to execute an image-related web application received by the client device over the network, to provide a list of images stored on the client device to the web application, and to present content, received from the web application, combining the list of images stored on the client device with a list of images stored at a remote location, wherein the content includes an image reference for each image included in the combined lists of images and an indication of whether each image is stored on the client device or at the remote location, whereby the web application may perform at least one function on the images regardless of where the images are stored.

18. The system of claim 17, wherein the web browser is configured to interpret the references included in the content provided by the web application and to render images associated with the interpreted references on the browser-enabled device.

19. The system of claim 17, wherein the at least one function performed by the web application includes at least one of an image viewing, editing, deletion, uploading, and searching function.

20. The system of claim 17, wherein the client device is an image-capture device.

* * * * *